Nov. 2, 1948.  E. C. BOURDETTE  2,452,898
INTERNAL HEAT INTENSIFIER
Filed May 3, 1945

INVENTOR.
EARL C. BOURDETTE

BY *Victor J. Evans & Co.*

ATTORNEYS

Patented Nov. 2, 1948

2,452,898

UNITED STATES PATENT OFFICE 2,452,898

INTERNAL HEAT INTENSIFIER

Earl C. Bourdette, Chickasaw, Ala.

Application May 3, 1945, Serial No. 591,819

1 Claim. (Cl. 237—50)

My present invention, in its broad aspect, has to do with improvements in devices for increasing heating efficiency and radiation, through the instrumentality of increasing the area of heated radiating surface with respect to the cubic foot of air to be heated, and to that end, I provide a novel arrangement of heat absorbing and radiating baffles in a heating chamber. More particularly it is my purpose to incorporate the aforementioned novel and unique means of increasing heating efficiency and radiation in an apparatus for heating, radiating, re-circulating and finally radiating and discharging the heated air, and in my apparatus, there is provided, (1) a novel baffle arrangement, (2) a novel and unique re-circulating system with forced draft and baffles, (3) a new and practical means for regulating the recirculation of heated air through the primary heating unit, (4) the provision of a novel distributing and radiating means, and (5) the provision of a simple, sturdy and practical heating device which may be used with any source of heat or any type of fuel to increase the heating efficiency thereof.

Other and equally important objects and advantages of my invention will be apparent from the following description and drawings, but it is to be understood that changes in form, size, shape, materials, construction and arrangement of parts may be made within my broad inventive concept and within the scope of the appended claim.

In the drawings wherein I have illustrated a preferred form of my invention—

In the drawings wherein like characters of reference are used to designate like or similar parts—

Figure 1:
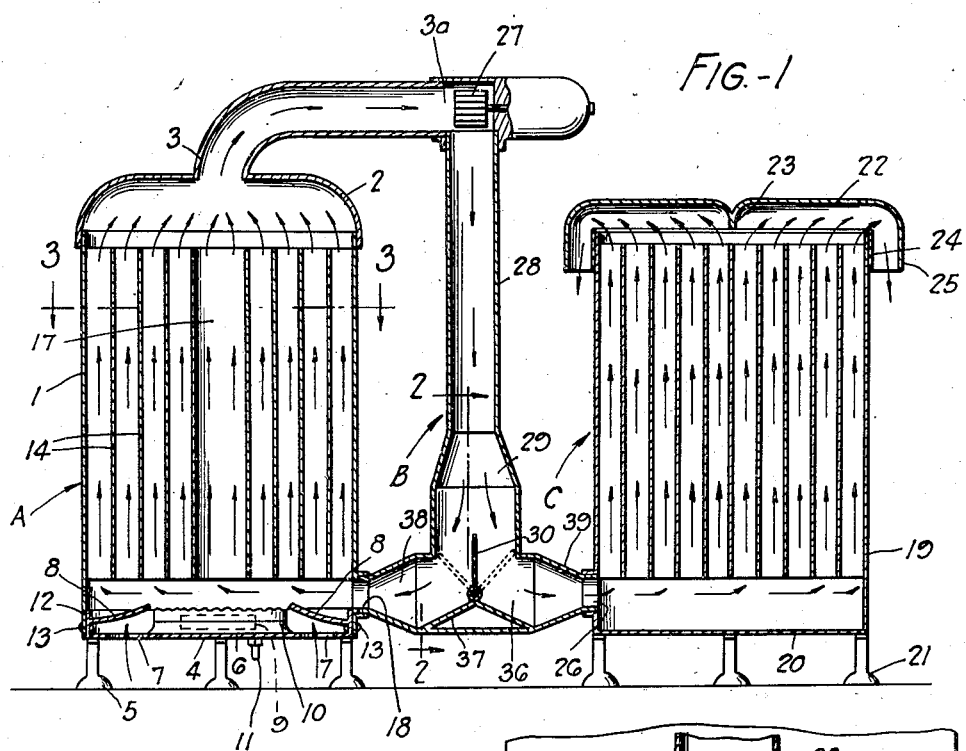
Figure 1 is a vertical section through my invention.
Figure 3:
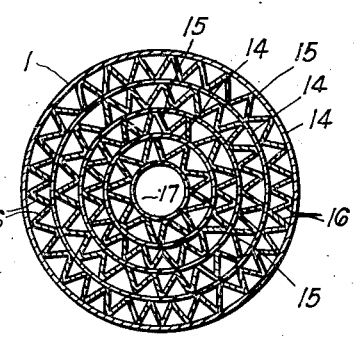
Figure 3 is a transverse section on the line 3—3 of Figure 1.
Figure 2:
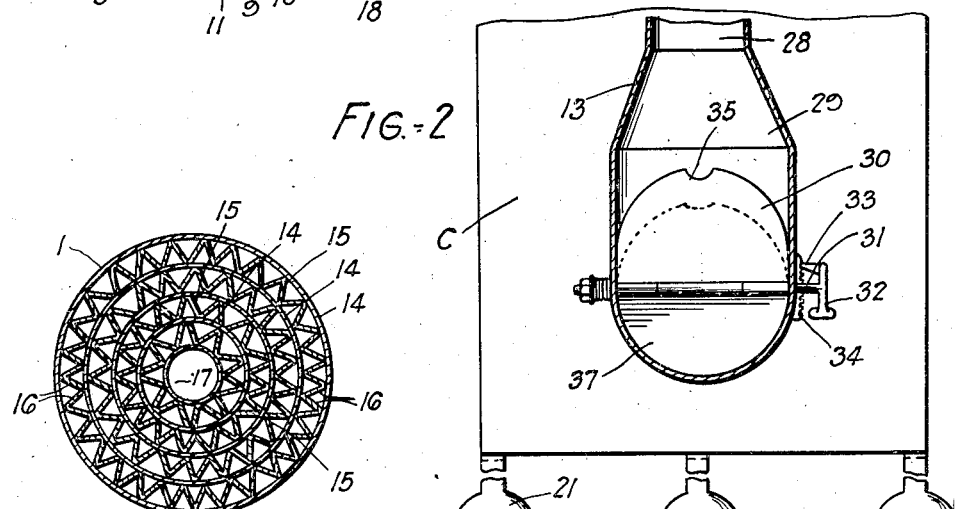
Figure 2 is a section on the line 2—2 of Figure 1.

The letter A designates generally the main heating and radiating unit, B the heat radiating and distributing unit, and C the means for forcing the draft and re-circulating the heated air in whole or in part that has passed through the main unit A into the unit B and subsequently into the unit C. For convenience, these units are generally designated and differentiated to simplify the description of the parts and operation of my device, but my broad inventive concept follows through all elements of my invention.

Referring to the main heating and radiating unit A, there is provided a cylindrical casing 1 which may be made of any bright metal, and has a cover 2 with a discharge conduit 3. A base 4 has legs 5 and a floor 6 with air intake openings 7 and upwardly and inwardly inclined baffle plates 8. Any suitable heating unit, such as an electrical heating element or hot plate 9 or the like, may be disposed centrally of the floor 6 in the space 10. A drain 11 is provided in the floor. The base 4 is flanged as at 12 and the casing 1 is supported on the floor of the base and may be attached to the flange as at 13.

Mounted within the casing 1 is a baffle unit of suitable black metal, comprising cylindrial, spaced, concentric inner walls 14 between which are spaced, concentric corrugated baffle plates 15 bent cylindrically to fit in the spaces between the walls. The number of corrugated baffle plates 15 and walls 14 may be varied to adjust the radiation and to conform to the air volume. The corrugated cylindrical members 15 are formed in the present embodiment with angularly arranged flat side walls 16. There are no baffles in the center, smallest cylindrical space 17. Air enters through the openings 7 and the intake 18, distributes over the hot plate, and passes upwardly between the baffles 15 and walls 14 contacting the extensive wall surface and becoming thoroughly heated, and then passes out through outlet or discharge conduit 3.

The unit C for distribution of hot air comprises a cylindrical casing 19, a base 20 and legs 21. Over the casing and spaced from the upper edge is a downwardly flanged hood 22 having a centrally located baffle 23. An inner wall 24 is spaced from the flange 25 of the hood and fits against the top of the casing. Within the casing 19 is a baffle unit in all respects like the baffle unit of the casing 1 of unit A, thereby presenting extensive heating surface to the heated air which rises from intake 26 upwardly between the baffles and out underneath and around the top beneath the hood 22 which causes wide distribution of the heated air.

Between the units A and C is a forced draft and re-circulation unit B which comprises a housing 3a connected with the outlet or discharge 3 of casing 1 of unit A and in which is mounted a fan 27 or blower, which may be of the turbine type. The blower forces the heated air down the conduit 28 into the chamber 29 in which is pivoted a deflecting plate or valve 30 on a shaft 31 having an operating handle 32 and a dog 33 and rack 34 to fix the plate or valve 30 in adjusted position. The plate or valve has a small notch or slot 35 in its edge so that when the valve is moved to a closing position, there is a small by-pass to prevent complete closure.

Below the plate or valve is a chamber 36 having a baffle 37 below the pivoting shaft 31 and two outlets 38 and 39, one to the unit A and the other to the unit C so that swinging of the plate or valve 30 directs the downwardly flowing heated air from the blower, back into the heating unit A or directly into the distributor unit C, or adjusted quantities of the heated air may be proportioned for direct transmission to the unit C or for re-circulation through unit A.

From the foregoing, it is believed that the operation and advantages of my invention will be apparent, but it is again emphasized that interpretation of the scope of my invention should only be conclusive when made in the light of the subjoined claim.

I claim:

A heating radiating recirculating and distributing apparatus comprising a heating unit having a cylindrical casing, spaced vertically arranged concentric corrugated baffles within the cylindrical casing of said heating unit, spaced cylindrical concentric inner walls within said cylindrical casing, said inner walls relatively spacing said baffles, a supporting base for said cylindrical casing, a heating element below the baffle on the support for said casing and an air outlet above the baffles, a distributing unit having a cylindrical casing, spaced vertically arranged concentric, corrugated baffles, cylindrical concentric inner walls within said cylindrical casing for said distributing unit, said inner walls adapted to relatively space said baffles, a supporting base for the cylindrical casing of said distributing unit and a hot air intake below the baffles on the supporting base of said distributing unit, a hood over the distributing unit and spaced therefrom to distribute heated air rising between the baffles, a conduit connecting the heating unit with the distributing unit, a blower interpolated in said conduit, a second conduit leading back into the heating unit from the first conduit and a valve for diverting air from the first conduit into the second conduit for re-circulation through the heating unit, said valve being pivoted above a baffle in the distributing chamber interpolated in the first conduit having connection with the second conduit.

EARL C. BOURDETTE.

REFERENCES CITED

The following references are of record in the file of this patent:

UNITED STATES PATENTS

| Number | Name | Date |
|---|---|---|
| 1,024,161 | Swett | Apr. 23, 1912 |
| 1,579,230 | Meinhardt | Apr. 6, 1926 |
| 2,013,193 | Stadtfeld | Sept. 3, 1935 |
| 2,198,136 | Stuart | Apr. 23, 1940 |
| 2,286,854 | Holtshouse | June 16, 1942 |
| 2,314,086 | Giffords | Mar. 16, 1943 |
| 2,331,907 | Harrington | Oct. 19, 1943 |